United States Patent
Sultenfuss et al.

(10) Patent No.: US 12,103,279 B2
(45) Date of Patent: Oct. 1, 2024

(54) SYSTEMS AND METHODS FOR INCORPORATING POST-CONSUMABLE MATERIAL IN LAYERED COMPOSITE

(71) Applicant: Dell Products L.P., Round Rock, TX (US)

(72) Inventors: Andrew Thomas Sultenfuss, Leander, TX (US); Nicholas D. Abbatiello, Round Rock, TX (US); Deeder M. Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 238 days.

(21) Appl. No.: 14/050,877

(22) Filed: Oct. 10, 2013

(65) Prior Publication Data

US 2015/0103487 A1  Apr. 16, 2015

(51) Int. Cl.
| | |
|---|---|
| B32B 27/14 | (2006.01) |
| B29B 17/00 | (2006.01) |
| B32B 3/04 | (2006.01) |
| G06F 1/16 | (2006.01) |

(52) U.S. Cl.
CPC .......... *B32B 27/14* (2013.01); *B29B 17/0042* (2013.01); *B32B 3/04* (2013.01); *G06F 1/1613* (2013.01); *B32B 2250/40* (2013.01); *B32B 2264/02* (2013.01); *B32B 2305/70* (2013.01); *B32B 2398/10* (2013.01); *B32B 2398/20* (2013.01); *B32B 2457/00* (2013.01); *Y02W 30/62* (2015.05); *Y10T 428/31678* (2015.04)

(58) Field of Classification Search
CPC ....... B32B 27/14; B32B 3/04; B32B 2250/40; B32B 2264/02; B32B 2305/70; B32B 2398/10; B32B 2398/20; B32B 2457/00; B29B 17/0042; G06F 1/1613; Y02W 30/62; Y10T 428/31678
See application file for complete search history.

(56) References Cited

U.S. PATENT DOCUMENTS

| | | | | |
|---|---|---|---|---|
| 4,952,448 A | * | 8/1990 | Bullock | B32B 27/12 428/323 |
| 5,312,573 A | * | 5/1994 | Rosenbaum | B29B 17/0026 264/148 |
| 5,945,643 A | * | 8/1999 | Casser | H05K 1/036 181/290 |
| 2002/0101707 A1 | * | 8/2002 | Canova, Jr. | G06F 1/1626 361/679.56 |
| 2007/0088094 A1 | * | 4/2007 | Tamaki | C08J 3/28 522/99 |
| 2008/0026721 A1 | * | 1/2008 | Wang | B32B 7/12 455/347 |

(Continued)

OTHER PUBLICATIONS

Aksomaityte et al., "Synthesis of Doped TiO2 Metal Oxide Nanoparticles in Supercritical CO2", available at http://folk.ntnu.no/skoge/prost/proceedings/aiche-2008/data/papers/P129008.pdf (Year: 2008).*

*Primary Examiner* — Patricia L. Nordmeyer
(74) *Attorney, Agent, or Firm* — Jackson Walker L.L.P.

(57) ABSTRACT

In accordance with embodiments of the present disclosure, a method for forming a layered composite structural member may include reducing post-consumable material in size into smaller particles, forming the smaller particles into a core layer of material, and coupling the core layer of material to at least one layer of laminate material.

16 Claims, 3 Drawing Sheets

(56) References Cited

U.S. PATENT DOCUMENTS

2012/0118773 A1* 5/2012 Rayner ................ G06F 1/1626
206/320
2012/0314354 A1* 12/2012 Rayner .................. H04M 1/18
361/679.01

* cited by examiner

SYSTEMS AND METHODS FOR INCORPORATING POST-CONSUMABLE MATERIAL IN LAYERED COMPOSITE

TECHNICAL FIELD

The present disclosure relates in general to information handling systems, and more particularly to incorporating post-consumable material into components of information handling systems, including chasses and other structural components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many structural components of information handling systems, such as chasses, and in particular such structural components visible from the exterior of information handling systems, may be manufactured from materials that traditionally are not readily recyclable or reusable for the same purpose, oftentimes due to reasons of aesthetics. For example, carbon fiber material set in plastic is often used in information handling system chasses. However, scrap carbon fiber material from component manufacturing or post-consumable carbon fiber material (e.g., from an obsolete information handling system) may not be readily reusable for another chassis, as the new chassis may have physical dimensions such that the carbon fiber chassis material may not be aesthetically attractive.

SUMMARY

In accordance with the teachings of the present disclosure, the disadvantages and problems associated with reuse of post-consumable material have been reduced or eliminated.

In accordance with embodiments of the present disclosure, a method for forming a layered composite structural member may include reducing post-consumable material in size into smaller particles, forming the smaller particles into a core layer of material, and coupling the core layer of material to at least one layer of laminate material.

In accordance with these and other embodiments of the present disclosure, an information handling system may include at least one information handling resource and a chassis enclosing the at least one information resource. The chassis may include at least one layered composite structural member having a layer of laminate material and a core layer coupled to the layer of laminate material and formed by reducing post-consumable material in size into smaller particles and forming the smaller particles into the core layer of material.

In accordance with these and other embodiments of the present disclosure, a layered composite structural member may include a layer of laminate material and a core layer coupled to the layer of laminate material and formed by reducing post-consumable material in size into smaller particles and forming the smaller particles into the core layer of material.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

Figure 1:
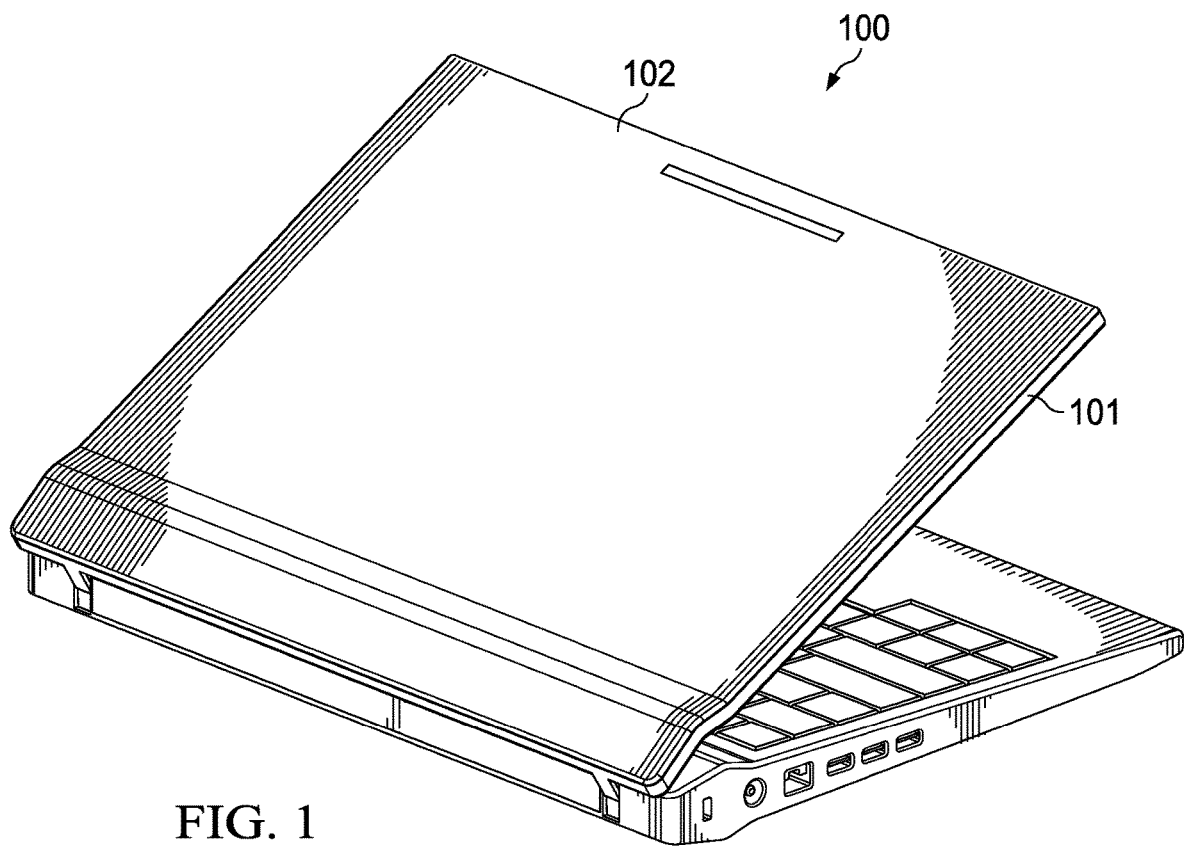
FIG. 1 illustrates an example information handling system, in accordance with certain embodiments of the present disclosure.

FIG. 1 illustrates an example information handling system 100, in accordance with certain embodiments of the present disclosure. Although FIG. 1 depicts information handling system 100 as a laptop or notebook computer, information handling system 100 may comprise any type of information handling system. For example, in some embodiments, information handling system 100 may be a mobile device sized and shaped to be readily transported and carried on a person of a user of information handling system 100 (e.g., a smart phone, a tablet computing device, a handheld computing device, a personal digital assistant, a notebook computer, etc.). In other embodiments, information handling system 100 may comprise a desktop or tower computer. In yet other embodiments, information handling system 100 may comprise a server or server enclosure.

As shown in FIG. 1, information handling system 100 may comprise a chassis 101. In general, a chassis 101 may comprise one or more structural members configured to enclose information handling resources (e.g., processors, memories, etc.) of information handling system 100 and provide structural strength in order to protect the various information handling resources of information handling system 100 from damage. As also depicted in FIG. 1, chassis 101 may comprise one or more layered composite structural members 102.

Figure 2:
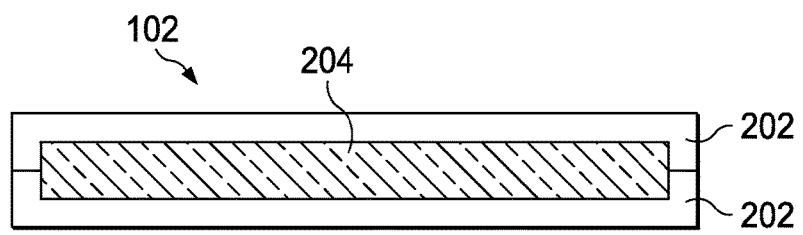
FIG. 2 illustrates a side elevation view of a layered composite structural member used in a structural component of the information handling system of FIG. 1, in accordance with certain embodiments of the present disclosure.

FIG. 2 illustrates a side elevation view of a layered composite structural member 102 used in a structural component of the information handling system of FIG. 1, in accordance with certain embodiments of the present disclosure. As shown in FIG. 2, layered composite structural member 102 may comprise at least one outer layer 202 and one core layer 204. In some embodiments, layered composite structural member 102 may comprise two outer layers 202, in which core layer 204 may be sandwiched between the two outer layers 202. In other embodiments, layered composite structural member 102 may comprise only a single outer layer 202, in which case core layer 204 may be coupled to the single outer layer 202 via an adhesive. In all of these embodiments, outer layers 202 may include a laminate material. Such laminate material may be an aesthetically-pleasing structural material (e.g., plastic, aluminum, carbon fiber set in plastic polymer, etc.).

Core layer 204 may comprise a layer of predominantly post-consumable material. As used herein, the term post-consumable material is intended to broadly include a waste type produced by the end consumer of a material (e.g., chassis components of an obsolete information handling system) as well as scrap material leftover from producing a particular component of an information handling system (e.g., leftover portions of sheets of chassis material of improper dimension of character to be used in a chassis). As described below, core layer 204 may be formed through processing post-consumable material to make such post-consumable material suitable for use in layered composite structural member 102.

Figure 3:
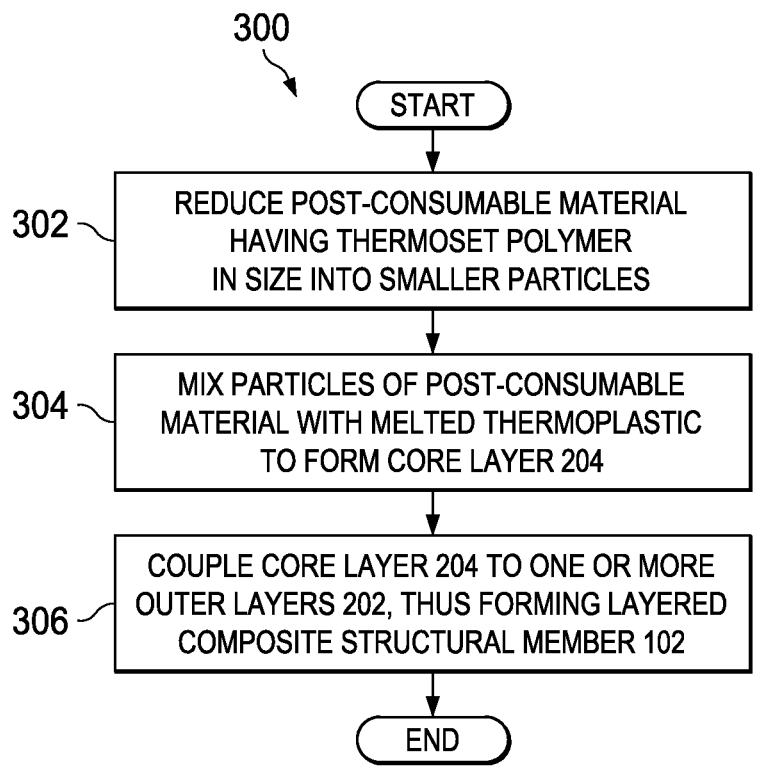
FIG. 3 illustrates a flow chart of an example method for using post-consumable material having thermoset polymer in a layered composite structural member, in accordance with certain embodiments of the present disclosure.

FIG. 3 illustrates a flow chart of an example method for using post-consumable material having a thermoset polymer in a layered composite structural member 102, in accordance with certain embodiments of the present disclosure. As is known in the art, a thermoset polymer generally cannot be melted, instead sublimating when heated to higher temperatures. According to some embodiments, method 300 may begin at step 302. However, the preferred initialization point for method 300 and the order of the steps comprising method 300 may depend on a chosen implementation.

At step 302, post-consumable material having thermoset polymer (e.g., carbon fiber or glass fiber set in thermoset polymer plastic) may be reduced in size (e.g., chopped, cut, milled, or ground) into smaller particles. In some embodiments, the size of the particles are to be smaller than the desired thickness of the layered composite structural member 102 to be formed with the particles (e.g., less than 0.25 micrometers).

At step 304, the particles of post-consumable material may be mixed with melted thermoplastic, which is allowed to harden, forming a core layer 204. In some embodiments, the ratio of post-consumable particle material to thermoplastic may range between approximately 40% to approximately 60%.

At step 306, core layer 204 may be placed between two outer layers 202 or adhered to one outer layer 202, thus forming layered composite structural member 102. In some embodiments, the post-consumable particle material of core layer 204 may be oriented in a particular manner relative to outer layers 202 so as to provide a desired structural characteristic (e.g., modulus) of layered composite structural member 102.

It is noted that layered composite structural member 102 may comprise any form of plastic or polymeric materials, including regions with low level of metal content. For example, in some embodiments a core layer 204 may contain up to 20% of metal content, wherein such metal which is reduced to smaller particulate as described above. As another example, in these and other embodiments core layer 204 may comprise semiconductor material, wherein such semiconductor material is reduced to smaller particulate as described above. By mixing such particulate with a thermoplastic, core layer 204 may sustain enough rigidity inside the laminate outer layers 202 to provide a sufficiently strong layered composite structural member 102 to effectively support an information handling system.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Figure 4:
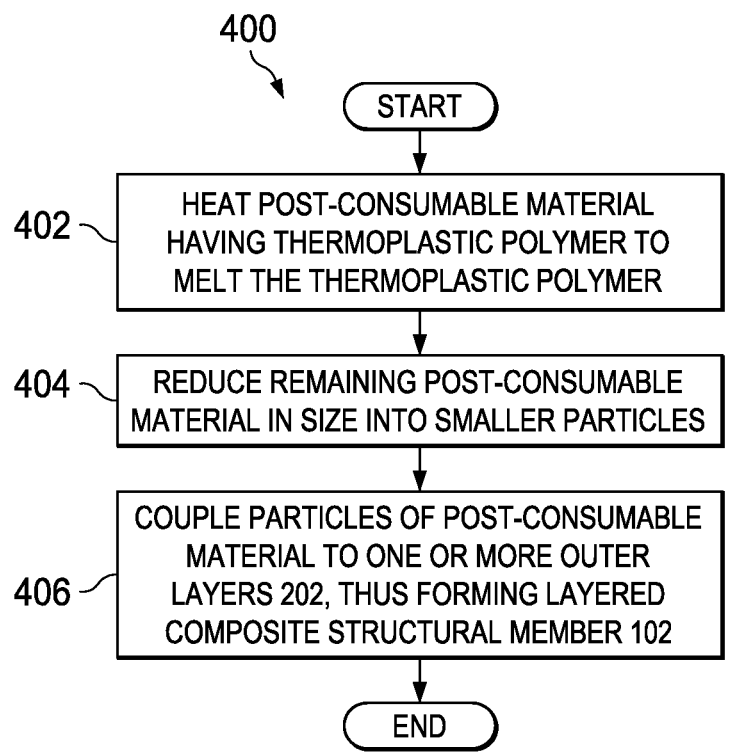
FIG. 4 illustrates a flow chart of an example method for using post-consumable material having thermoplastic polymer in a layered composite structural member, in accordance with certain embodiments of the present disclosure.

FIG. 4 illustrates a flow chart of an example method 400 for using post-consumable material having a thermoplastic polymer in a layered composite structural member, in accordance with certain embodiments of the present disclosure. According to some embodiments, method 400 may begin at step 402. However, the preferred initialization point for method 400 and the order of the steps comprising method 400 may depend on a chosen implementation.

At step 402, post-consumable material having a thermoplastic polymer (e.g., carbon fiber or glass fiber set in thermoplastic polymer plastic) may be heated, thus melting the thermoplastic polymer, leaving behind material that either is thermoset or has a higher melting point than thermoplastic.

At step 404, the remaining post-consumable material may be reduced in size (e.g., chopped, cut, milled, or ground) into smaller particles. In some embodiments, the size of the particles may be less than 1 millimeter.

At step 406, the particles of post-consumable material may be placed between two outer layers 202 or adhered to one outer layer 202, thus forming layered composite structural member 102. In some embodiments, the post-consumable particle material of core layer 204 may be oriented in a particular manner relative to outer layers 202 so as to provide a desired structural characteristic (e.g., modulus) of layered composite structural member 102.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Figure 5:
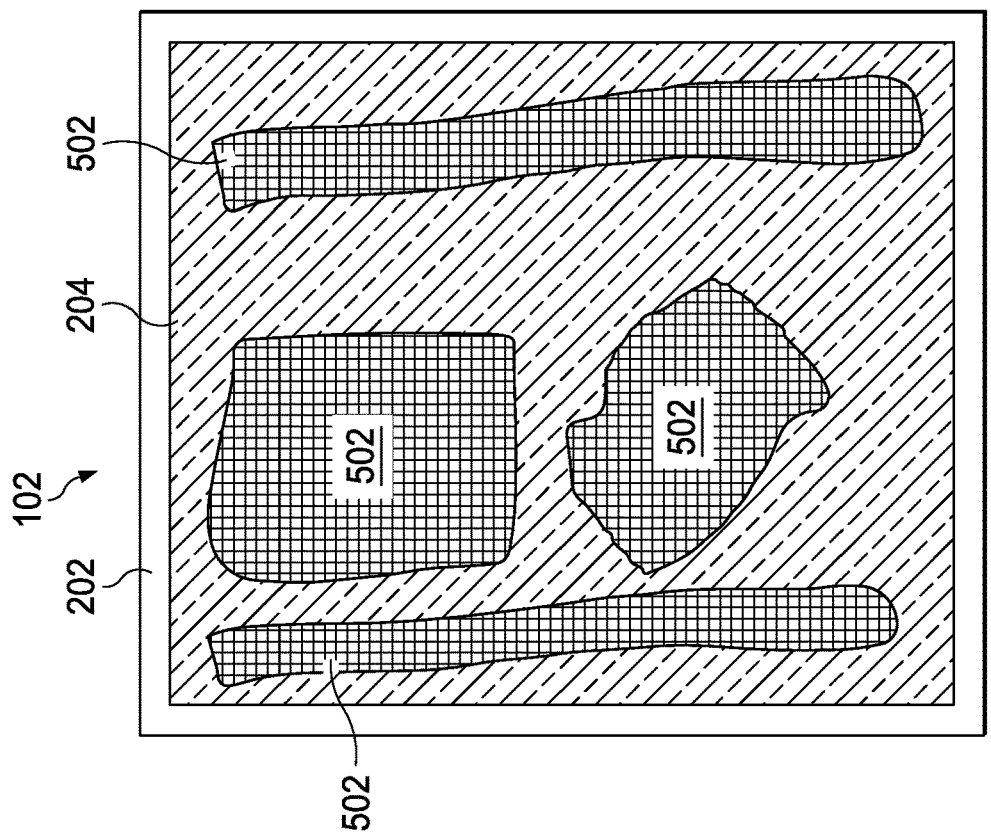
FIG. 5 illustrates a cross-sectional top plan view of an example layered composite structural member of the information handling system of FIG. 1, in accordance with certain embodiments of the present disclosure.

FIG. 5 illustrates a cross-sectional top plan view of an example layered composite structural member 102, in accordance with certain embodiments of the present disclosure. In some embodiments, various pieces 502 of post-consumable material may be sized and/or shaped to desired dimensions, then mixed with melted thermoplastic to form core layer 204, which may then be coupled to one or more outer layers 202. In such embodiments, such pieces may be oriented within core layer 204 so as to provide desired structural characteristics of layered composite structural member 102.

Figure 6:
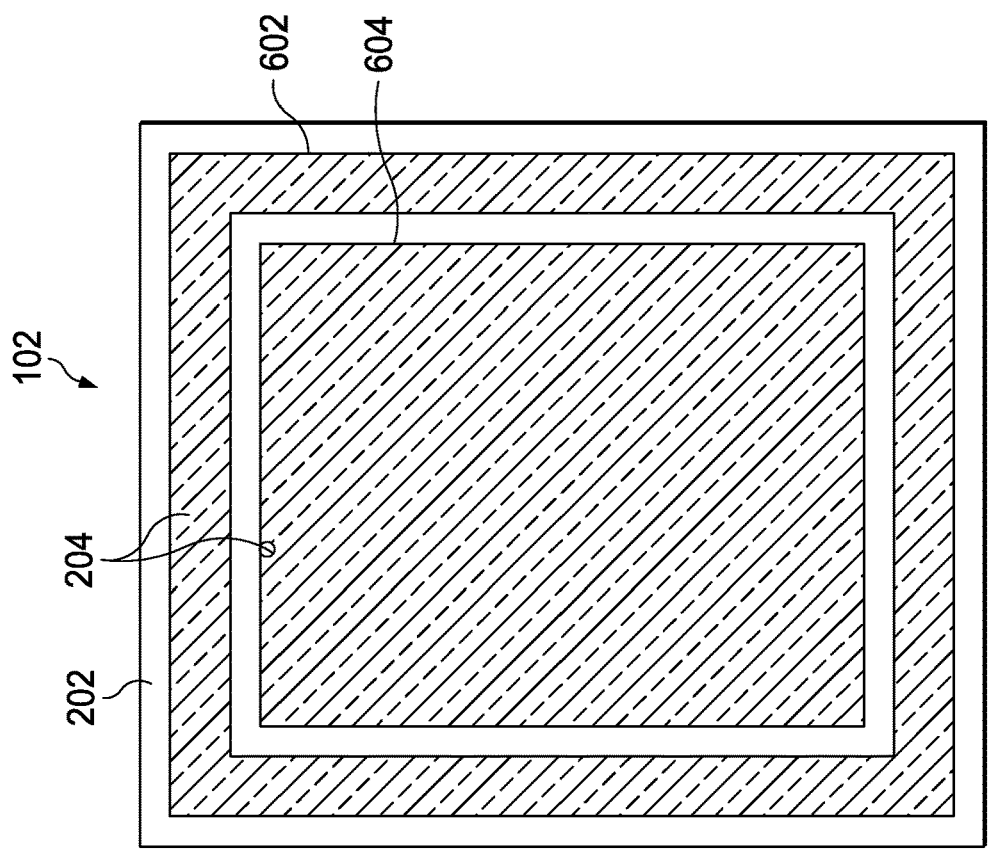
FIG. 6 illustrates a cross-sectional top plan view of another example layered composite structural member of the information handling system of FIG. 1, in accordance with certain embodiments of the present disclosure.

FIG. 6 illustrates a cross-sectional top plan view of another example layered composite structural member 102, in accordance with certain embodiments of the present disclosure. In some embodiments, different regions of core layer 204 may have different compositions of post-consumable material, such that corresponding different regions of layered composite structural member 102 have different moduli. For example, as shown in FIG. 6, core layer 204 may comprise one composition of post-consumable material (e.g., carbon fiber) around its perimeter region 602 and another composition of post-consumable material (e.g., glass fiber) in its center region 604, such that the regions 602 and 604 have different moduli (e.g., rigid in the perimeter region 602 and more elastic in center region 604).

Although the present disclosure has been described in detail, it should be understood that various changes, substitutions, and alterations can be made hereto without departing from the spirit and the scope of the disclosure as defined by the appended claims.

What is claimed is:

1. A contiguous composite structural member, wherein the contiguous composite structural member includes:
    an pair of contiguous outer layers including a first contiguous outer layer and a second contiguous outer layer, both contiguous outer layers comprising a laminate material; and
    a contiguous core layer sandwiched between and entirely enclosed by the first and second contiguous outer layers, wherein the contiguous core layer includes a rectangular major surface and has a desired thickness and wherein the contiguous core layer includes particles of post-consumable material and a thermoplastic material;
    wherein the rectangular major surface of the contiguous core layer consists of a center region and a perimeter region surrounding the center region, wherein the center region is a rectangular region comprising all but the perimeter region of the rectangular major surface, wherein the center region and the perimeter region are regions of a single contiguous layer and wherein a composition of post-consumable material in the perimeter region differs from a composition of post-consumable material in the center region and wherein the composition of the perimeter region is more rigid than the composition of the center region.

2. The contiguous composite structural member of claim 1, wherein the particles of post-consumable material include thermoset polymer plastic.

3. The contiguous composite structural member of claim 2, wherein the particles of post-consumable material further include fibers set in the thermoset polymer plastic.

4. The contiguous composite structural member of claim 3, wherein the fibers set in the thermoset polymer plastic comprise carbon fibers.

5. The contiguous composite structural member of claim 4, wherein the particles of post consumable material further include a semiconductor material.

6. The contiguous composite structural member of claim 4, wherein the particles of post consumable material further include a metal.

7. The contiguous composite structural member of claim 6, wherein the metal comprises as much as 20% of the core layer content.

8. The contiguous composite structural member of claim 1, wherein a size of the particles of post-consumable material is less than 1 mm.

9. An information handling system, comprising:
    at least one information handling resource;
    a chassis enclosing the at least one information resource and comprising a contiguous composite structural member, wherein the contiguous composite structural member includes:
        a pair of contiguous outer layers including a first contiguous outer layer and a second contiguous outer layer, both contiguous outer layers comprising a laminate material; and
        a contiguous core layer, sandwiched between and entirely enclosed by the first and second contiguous outer layers, wherein the contiguous core layer includes a rectangular major surface and has a desired thickness and wherein the contiguous core layer includes particles of post-consumable material and a thermoplastic material;
        wherein the rectangular major surface of the contiguous core layer consists of a center region and a perimeter region surrounding the center region wherein the center region is a rectangular region comprising all but the perimeter region of the rectangular major surface, wherein the center region and the perimeter region are regions of a single contiguous layer and wherein a composition of post-consumable material in the perimeter region differs from a composition of post-consumable material in the center region and wherein the composition of the perimeter region is more rigid than the composition of the center region.

10. The information handling system of claim 9, wherein the particles of post-consumable material include thermoset polymer plastic.

11. The information handling system of claim 10, wherein the particles of post-consumable material further include fibers set in the thermoset polymer plastic.

12. The information handling system of claim 11, wherein the fibers set in the thermoset polymer plastic comprise carbon fibers.

13. The information handling system of claim 11, wherein the particles of post consumable material further include a semiconductor material.

14. The information handling system of claim 11, wherein the particles of post consumable material further include a metal.

15. The information handling system of claim 14, wherein the metal comprises as much as 20% of the contiguous core layer content.

16. The information handling system of claim 11, wherein a size of the particles of post-consumable material is less than 1 mm.

\* \* \* \* \*